June 4, 1929. A. L. GENTER 1,716,040
CONTINUOUS FILTER THICKENING APPARATUS
Filed Oct. 16, 1925 5 Sheets-Sheet 3

INVENTOR
Albert L. Genter
BY
Pennie, Davis, Marvin & Edmonds
his ATTORNEYS

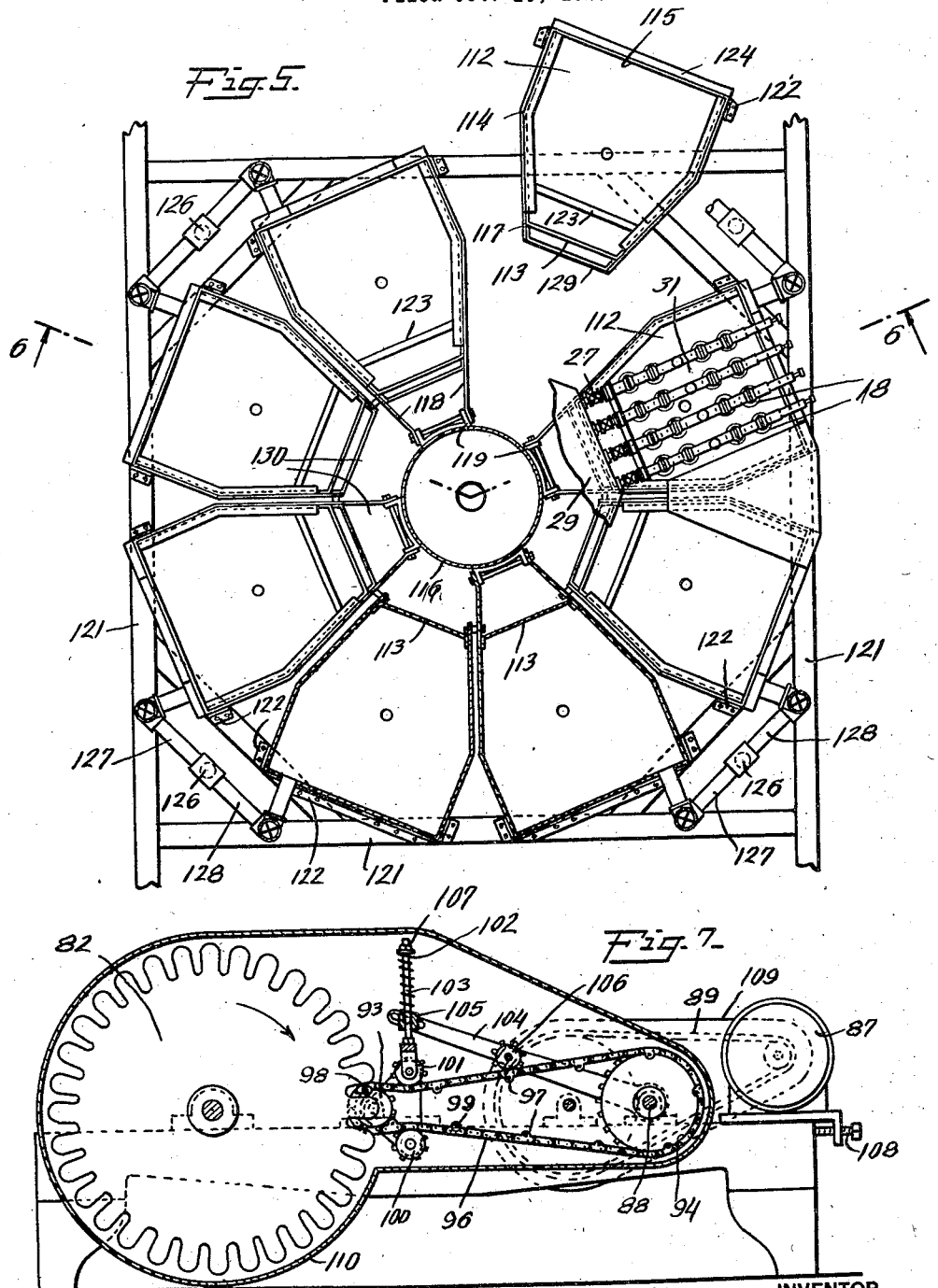

June 4, 1929. A. L. GENTER 1,716,040
CONTINUOUS FILTER THICKENING APPARATUS
Filed Oct. 16, 1925 5 Sheets-Sheet 5
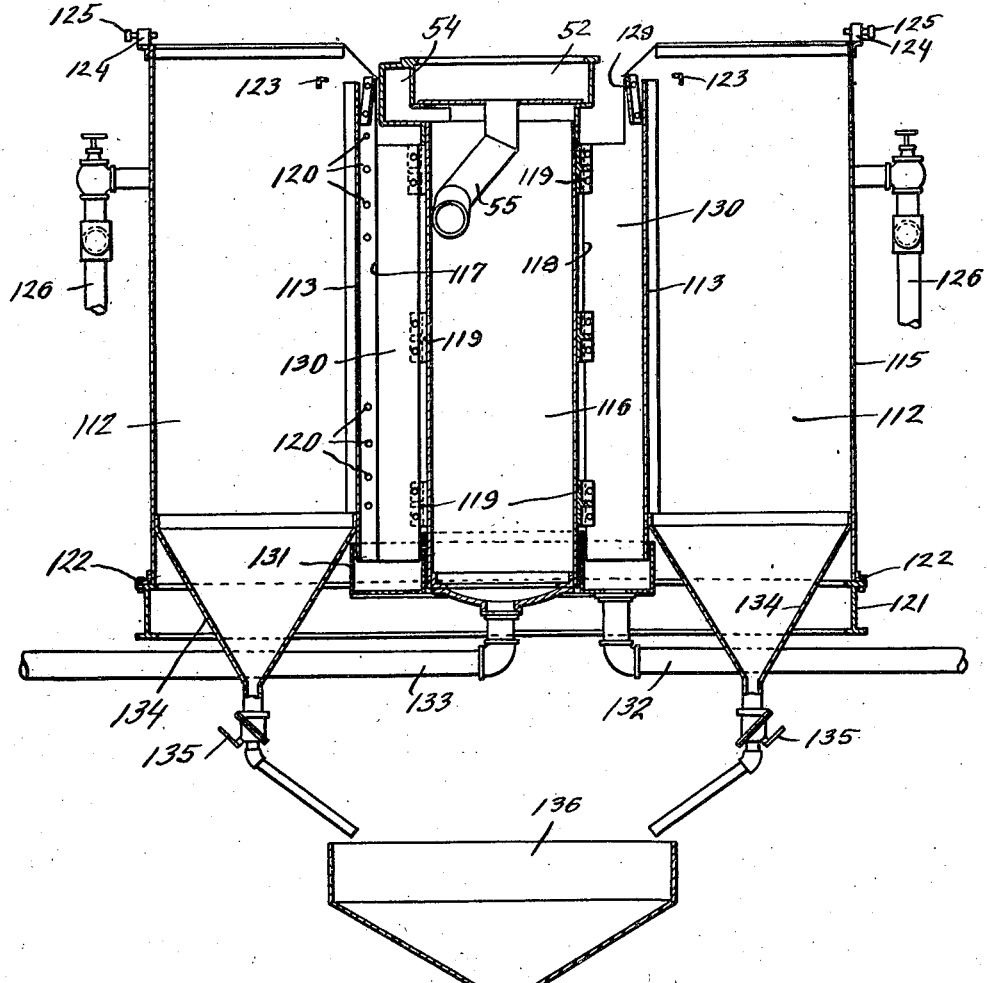
Fig. 8.
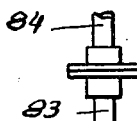
INVENTOR
Albert L. Genter
BY
Pennie, Davis, Marvin & Edmonds
his ATTORNEYS

Patented June 4, 1929.

1,716,040

UNITED STATES PATENT OFFICE.

ALBERT LEGRAND GENTER, OF SALT LAKE CITY, UTAH, ASSIGNOR TO GENTER THICKENER COMPANY, A CORPORATION OF DELAWARE.

CONTINUOUS-FILTER THICKENING APPARATUS.

Application filed October 16, 1925. Serial No. 62,721.

This invention relates to apparatus for thickening mixtures of liquids and solids in which the clear liquid product is removed by filtration and it has for its object the provision of an improved filter-thickening apparatus. More particularly the invention has to do with apparatus in which the filtration is effected by a plurality of hollow filtering elements, preferably of a tubular and slightly conical form, submerged in the material to be filtered and thickened. These filtering elements include suitable filtering media such as a covering of canvas or the like and the interior of the elements is alternately connected to a vacuum chamber and a source of cleansing pressure by means of an appropriate timing valve. The filtration cyle is thus divided into successively recurring periods of filtration and cleansing.

During the filtration period the solids or sediment collects on the outside surfaces of the canvas and during the cleansing period these solids are appropriately discharged or flooded out of contact with the surface of the filter elements and allowed to settle toward the bottom of the mixture. The clear liquid filtrate is carried over into the vacuum chamber from which it is removed in an appropriate manner and the solids settling toward the lower portion of the mixture are collected in any convenient way such as by means of a cone or the provision of slowly moving rakes at the bottom of the container in which the mixture is held.

Apparatus of this general type is shown in Patent No. 1,359,162 granted to me on November 16th, 1920. This prior apparatus has proved to be operatively successful but by constructing the apparatus in accordance with my present invention numerous added advantages are secured. In constructing filter-thickening apparatus of this type one of the important considerations is that of conserving the space in the plant where it is installed and to this end as many filtering elements as possible must be provided for in a container or tank of a given size. It is also important to reduce the losses in the vacuum line between the filtering elements and the vacuum chamber or filtrate receiver to as low a point as possible, and in the filtration of hot liquids to so arrange the apparatus that the temperature of the filtrate is maintained relatively high and the heat losses during the process are small.

Furthermore, it is important that a certain flexibility in operation be provided for. As a practical matter it is usual to install in commercial plants a larger amount of filter-thickening area than is ordinarily necessary, this additional size being convenient to take care of variations in the quantity and nature of the material being handled. Certain materials undergo physical or chemical changes if the liquids and suspended solids are kept too long in contact with each other. Hence the desirability of so arranging the thickener apparatus that its size may be varied according to the amount of material which it is desired to handle.

In order to secure the most effective and efficient operation of the apparatus it is important that appropriate actuating mechanism be provided for the purpose of giving to the timing valve a step-by-step movement from the filtration to the cleansing position and vice versa. A sudden and rapid shifting between these positions, particularly where either of the periods of the filtration cycle is of short duration, is of especial importance. It provides that the valve is in either wide open or entirely closed position so that a maximum amount of material is moved through the valve in one direction or the other and so that losses by friction are cut down. Moreover, in the treatment of hot mixtures a sudden application of the counter current pressure compresses the vapor which has formed during the filtration period more effectively than a comparatively slow and gradual application of this pressure.

In addition it is of advantage that the actuating mechanism be so arranged as to cause a pause of the timing valve just after the cleansing current is cut off so as to leave the filtering element or group of elements that has just undergone cleansing cut off for an instant both from vacuum and from cleansing pressure. I have found that this effects a more rapid settling of the solids because of the fact that the solids which have just been freed from actual contact with the surface of the canvas by the counter current flood are allowed to slide or skid down the filtering elements in more or less of a mass formation toward the lower portion of the mixture. According to the present invention the apparatus is arranged with the vacuum chamber or filtrate receiver at its center, the filtering elements being placed around this receiver.

The timing valve is located close to the receiver and preferably immediately above it. The filtering elements are arranged in rows and one or more rows are connected to a passage-way, the result being that the elements surround the filtrate receiver and timing valve. By thus placing the receiver within the interior and at the center of the entire group of filtering elements the losses in the relatively long vacuum line which have heretofore existed betwen the timing valve and the vacuum chamber or filtrate receiver are materially reduced. The space occupied heretofore by the receiver and its connecting piping is eliminated and the receiver now occupies space which has heretofore been unused. Also by placing the receiver within the assemblage of filter elements it is substantially submerged or closely surrounded by the material undergoing treatment and in the case of hot mixtures the filtrate is maintained at substantially the same temperature as the body of the mixture surrounding it so that an extremely small temperature loss occurs during filtration.

The present invention also involves the arrangement of the filtering elements in such manner that not all of the rows are placed radially but the elements are preferably arranged in banks each containing a number of parallel rows of elements, these banks themselves being radially placed about the timing valve and receiver. This secures a particularly compact arrangement of the elements inasmuch as they are placed close together in rows to form the banks, but the banks being radially positioned provide spaces between them through which it is particularly convenient to place the steel beams for supporting the receiver and timing valve at the center of a single thickening tank. These spaces between adjacent banks of elements also give access to the interior of the tank for inspection and repair. In order to secure flexibility of operation the invention includes the subdividing of the usual single thickening tank into a plurality of compartments, or the construction of a plurality of relatively small thickening or settling tanks in place of one large tank. The arrangement of the filter elements in radially positioned banks of parallel rows facilitates this construction. One compartment or one small tank is placed around each bank of filter elements.

In this modification of the invention I preferably construct the centrally located filtrate receiver or vacuum chamber so that it may rest upon the supporting floor for the apparatus and so that it may serve to tie together a number of the small thickening tanks surrounding it. Alternate tanks are preferably bolted or otherwise secured to the exterior of the filtrate receiver and the intermediate tanks are in turn secured to these. Suitable valve control inlets are arranged for the individual thickening tanks so that any desired number may be placed in operation and the overflow takes place over the interior edge of each tank toward the filtrate receiver and is collected in an annular trough preferably attached to the exterior of the receiver.

The bottoms of each of the individual small tanks are formed with mud collecting cones terminating in suitable outlet valves, or provided with stirring apparatus, depending upon the character of the material to be thickened. The mud outlets from the several thickening tanks are directed into a single receptacle from which the solids or sludge is removed.

The valve actuating mechanism for producing the step-by-step sudden shifting and pause movement comprises a toothed wheel operatively connected to the rotating plug of the timing valve to rotate the same. Cooperating with this gear there is a traveling band such as a chain that is carried over a pair of spaced sprockets and the chain carries one or more actuating pins which engage the notches between the teeth of the toothed wheel and advance the same in a step-by-step movement which occurs with extreme suddenness to shift the valve rapidly from one position to the next. By varying the position of these pins on the chain, or the number of pins carried by the chain the length of time during which the valve remains in the cleansing current or kick-back position and the cut-off position can be easily varied. By varying the speed at which the chain is driven these same times can also be varied and in addition the length of the filtration period can be varied.

A further understanding of the invention will be obtained by a reference to the accompanying drawings illustrating by way of example apparatus embodying the principles of the invention. In these drawings Fig. 1 is a transverse section through the improved filtering apparatus of the invention taken on the broken line 1—1 of Fig. 2;

Fig. 5 is a top view of a modified form of apparatus employing a plurality of sectional tanks;

Fig. 6 is a vertical section taken on the broken line 6—6 of Fig. 5;

Figs. 7 and 8 are respectively a vertical transverse section and a plan of the improved timing valve actuating mechanism.

Figure 1:
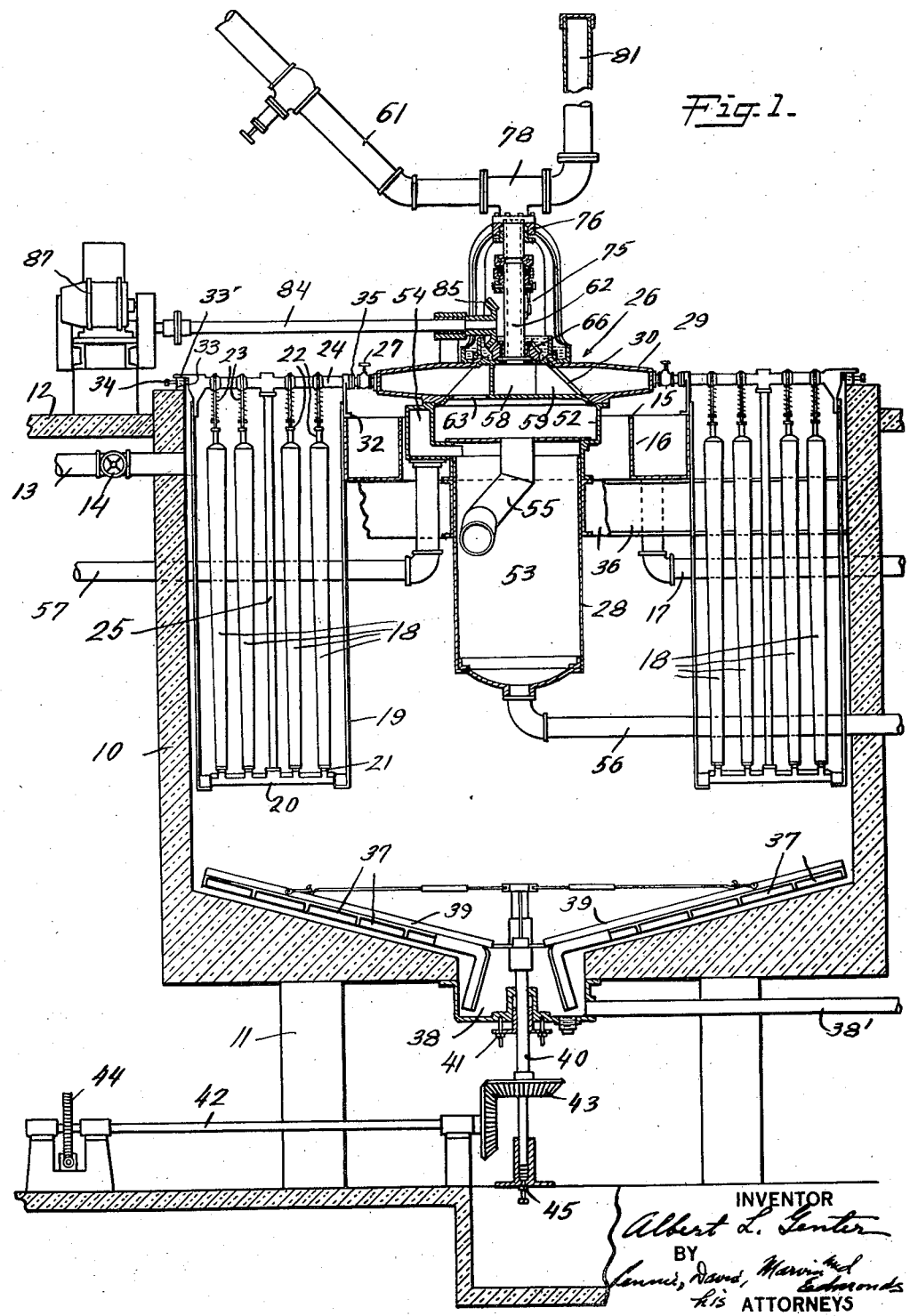

Referring to the accompanying drawings, the mixture of material to be thickened is contained in the tank or container 10, which is shown as being constructed of concrete, but which may be made of any appropriate material. The tank rests upon supports 11, and an operating floor 12, is provided near the top of the tank from which the operation and control of the apparatus is largely carried on.

The bottom of the tank is preferably made sloping, and over this bottom a number of rakes 37 are adapted to move and work the solids which settle to the bottom of the tank, towards the sump 38, from which they are removed through the solids discharge pipe 38'. These rakes 37, are carried upon radial arms 39, which are slowly rotated by means of shaft 40, to which they are rigidly attached. Shaft 40 passes through a stuffing box 41, and is driven by means of horizontal shaft 42 through the beveled gearing 43. Shaft 42 in turn is given a slow rotational movement by power suitably applied thereto through the worm gearing 44. An adjustable step bearing 45 is provided for raising or lowering the position of rakes 37 with respect to the sloping bottom of the tank.

The mixture to be thickened is fed to the tank 10 through the feed pipe 13, under the control of feed valve 14, and the level of the mixture within the tank is maintained by the overflow lip 15 of an annular launder 16, the liquid overflowing into launder 16 being carried away to a suitable outlet pipe 17. Thus the filter elements 18 are maintained submerged in the material to be thickened. These filter elements comprise tubular socks of foraminous material such, for example, as canvas supported on the interior by a suitable frame work so as to maintain chambers therein for the collection of filtrate.

These tubular hollow filter elements 18, are preferably supported within frames 19, from which they are readily removable in accordance with the provisions of co-pending application, Serial No. 36,134, filed June 10, 1925. Thus each of the elements 18, rests on a hollow manifold 20 at the bottom of the filter element frame 19, the interior of these elements being connected to the interior of the manifold 20 for the passage of filtrate, and a liquid-tight connection being secured in any suitable manner, as by means of packing washers 21.

The frames 19 are removably held in place by means of the manually releasable spring pressed bolts 22, at the tops of the elements, these bolts as shown in Fig. 1, being attached to the end of the yoke members 23, which pass upwardly around the upper cross-member 24 of frame 19, and slide in grooves in this member.

The manifold 20 and the upper cross member 24 of the frames 19, are connected by a conduit 25, which leads the filtrate from the bottoms of filter elements 18 to the interior of member 24, and thence to the timing valve 26, through appropriate disconnecting valves 27.

Substantially at the center of tank 10, there is provided a vacuum chamber and filtrate receiver 28, which is preferably located directly beneath the timing valve and preferably submerged in the mixture to be thickened. The details of the operation of this receiver will be taken up below.

The timing valve 26 comprises a stationary casing or filtrate collecting head 29, and a rotary plug member 30, whereby the interiors of the filter elements 18 are successively placed in connection with a source of suction or reduced pressure to produce filtration, and a source of cleansing pressure to remove the solids which collect on the exterior surface of the filter elements during filtration.

Figure 2:
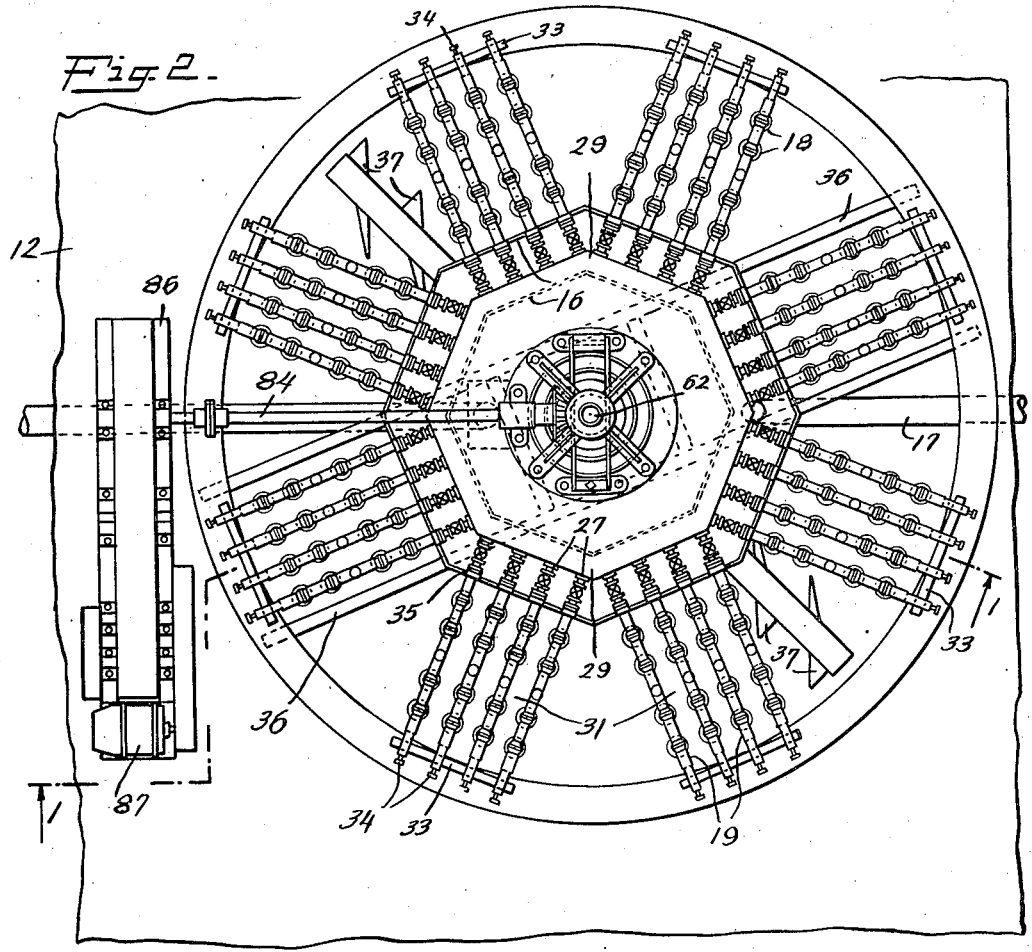
Fig. 2 is a plan view of the apparatus.

The filtrate collecting head 29 of the timing valve is conveniently made polygonal in shape, and in Fig. 2 it is shown as octagonal. The filtering elements 18 are circularly arranged around the timing valve 26 and filtrate receiver 28 as shown in Fig. 2. In the embodiment of the invention shown in the drawings four filter elements 18 are contained in each of the frames 19, so that four filter elements are arranged in a row. The disposition of the plurality of filter elements, as is to be seen from Fig. 2, is in form of a plurality of banks, 31, each comprising four filter element frames 19, and hence four rows of filter elements 18. Each of the filter element frames is removably supported within the tank 10 by means of a foot 32, which rests upon the top of the annular overflow launder 16, and by a shoulder 33; which rests upon members 33 on the top of the periphery of the tank 10. Through members 33, a plurality of bolts 34 are threaded for the purpose of securely closing the nipple joints 35, by which each of the filter conduits of the filter element frames art connected to the disconnecting valves 27.

By making the filtrate collecting head 29 polygonal in shape, the valves 27 can be arranged in a particularly practical manner along each flat side of the collecting head and the frames 19 can be conveniently inserted and removed. Moreover, by the arrangement of the filter elements in a plurality of radially disposed banks around the timing valve, each bank consisting of a number of parallel frames, there is provided a considerable space of a general triangular shape between each pair of adjacent banks or elements. Through this space between the banks pass two or more transverse steel beams 36, which extend across the tank and serve as the support for the timing valve 26 and receiver 28.

Furthermore, this space between the banks 31 facilitates the insertion and removal of frames 19 and provides an entrance through which an operator can readily gain access to the interior of substantially any portion of tank 10, and to the rake mechanism previously described whenever such access is necessary, as, for example, to make repairs.

Figure 4:
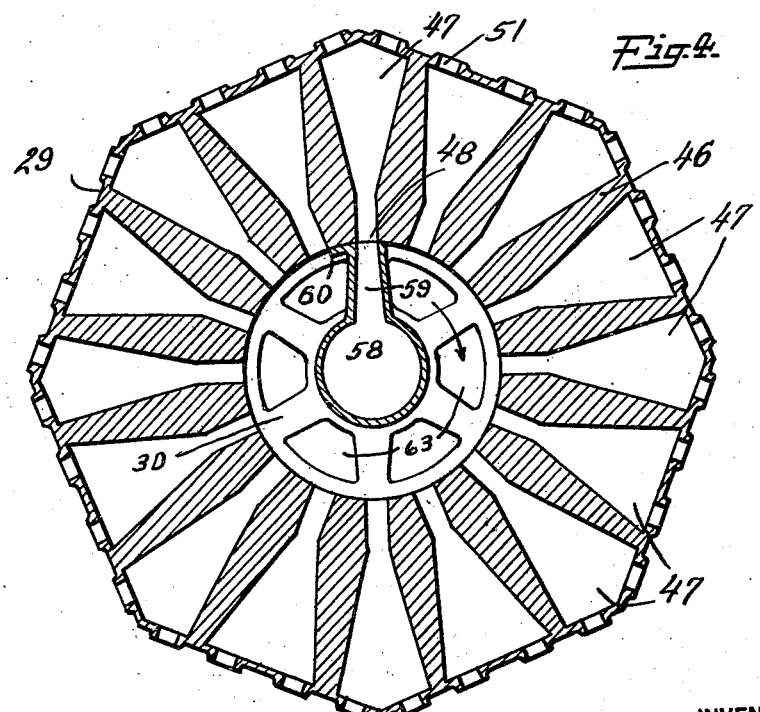
Fig. 4 is a horizontal section taken on the line 4—4 of Fig. 3, to show the structure of the rotating valve plug, and the radiating filtrate channels in the casing.

The construction of the interior of timing valve 26 may be understood from Fig. 4. The interior of the filtrate collecting head 29 is sub-divided by radial partitions 46, into a plurality of channels or passageways 47, which radiate from the ports 48 that are equally spaced around the tapering interior surface 49 of the conical chamber 50 within which rotates the conical plug 30. The channels 47, as they radiate from the common chamber 50 at the center of the collecting head 29, increase in width and can conveniently receive two or more threaded openings 51, for the disconnecting valves 27. A separate port 48 may, however, be provided for each disconnecting valve if desired.

As was mentioned above, the filtrate receiver and vacuum chamber 28 is preferably arranged directly beneath the timing valve 26. This receiver may be conveniently made in cylindrical shape and divided into three interconnected chambers 52, 53 and 54. Chamber 52 is preferably secured to collecting head 29 directly beneath the valve plug 30, and discharges into main chamber 53 through pipe 55, which forms, together with the walls of receiver 28, a cyclone separator, which aids in the separation of the liquid from the vaporized filtrate. The liquid filtrate is removed from receiver 28 through pipe 56 by means of a suitable pump and the vaporized filtrate, together with any air which may be present, passes from chamber 53 up into the chamber 54, which opens out of chamber 53 at the top, and is drawn out through pipe 57 which is connected to an appropriate suction or vacuum pump. These two pumps which are connected to pipes 56 and 57 respectively produce and maintain a reduced pressure or vacuum within the interior of receiver 28.

The rotating valve plug 30 has an interior circular chamber 58, with which a single port 59, communicates, and to the left of port 59 there is an extended wall portion 60. This valve plug is caused to rotate in a step-by-step movement, which causes the plug to assume two consecutive positions with respect to each of ports 48 consecutively.

In the first position, which is shown in Fig. 4, port 59 is opposite the port 48 which is at the top of Fig. 4, so that this port and its channel 47 are in communication with the chamber 58, to which there is continuously supplied a source of cleansing pressure through pipe 61 and tubular member 62 (Fig. 1). When the valve plug is in this position, therefore, cleansing pressure will be applied to the interior of the filter elements which are connected to the particular channel 47 in question. All of the remaining filter elements which are connected to the remaining ports 48, are, however, subject to suction from the receiver 28 and filtrate is passing through these remaining channels 47 and ports 48 into the central chamber 50, from whence it is free to pass through openings 63 in valve plug 30, into chamber 52, and thence pipe 55 to main chamber 53 of receiver 28.

In the next position of valve plug 30, the wall portion 60 thereof completely cuts off circular chamber 58 both from suction and from cleansing pressure. Moreover, port 59 is itself cut off by the section of blank wall between the adjacent ports 48. Thus the filter elements 18 which are connected to top port 48, are during the moment of pause of valve plug 30 in this position, cut off both from filtration and cleansing pressure. The effect of this pause will be described more fully below.

In the next step-by-step movement of plug 30, it assumes the same position with respect to port 48 which is just to the right of the top port of Fig. 4, as is shown in Fig. 4 with respect to top port 48. Hence cleansing pressure is now being applied to the filter elements connected with this second port.

The result of these positions of valve plug 30 with respect to each of the ports 48 is thus to consecutively and repeatedly cut off the ports individually from filtration suction, and apply cleansing pressure, and then to cut off both filtration and cleansing pressure. In other words, each port 48, and its connected filter elements 18 is carried through a 3-stage cycle. The first step is that of filtration suction, the second that of cleansing pressure application, and the third is the pause during which both filtration suction and cleansing pressure are cut off. The details of construction of the remaining parts of the valve mechanism and of the valve operating mechanism by which the valve is rotated in the step-by-step movement will be described below.

Briefly, the operation of the apparatus is as follows. The material to be thickened is fed to the tanks or container 10 through supply pipe 13, the flow being regulated by valve 14. The level of the mixture is determined by the height of the overflow 15 and the overflowing material passes out through pipe 17 and is returned to the storage tank. Appropriate cleansing liquid is supplied to the apparatus through pipe 61 and suction is applied to chamber 53 of the filtrate receiver 28 by means of the pumps which are connected in outgoing pipe lines 56 and 57 respectively.

The step-by-step movement of valve plug 30 above described results in the production of a filtering action by the filter elements 18 through the application of reduced pressure to the interiors thereof, the filtering elements being periodically cleansed in groups by the pressure from pipe 61 so that a majority of the filtering elements are always filtering while the remainder are being cleansed. The solids which are discharged from the exteriors of filter elements 18 during the cleansing periods, together with any solids which may in some mixtures settle by natural action, gradually move downward within the tank and collect on the bottom thereof from which they are removed through outlet pipe 38' by the action of rakes 37.

Referring again to the step-by-step movement of the valve, the operating mechanism is so adjusted as to cause a rotation of the plug 30 to give the desired duration of filtration and cleansing periods and the desired pause between these periods. The length of these periods varies with the characteristics of the material being thickened, the duration of the filtration period varying usually from about 30 seconds to several minutes, and the duration of the cleansing period from about two second to three seconds. For the filtration of hot or boiling mixtures the filtration period is usually about 30 seconds and the cleansing or kick-back period from 2 to 3 seconds.

During the filtration period the solids accumulate on the exterior surfaces of the filter elements 18 in a tube-like formation of slightly interconnected particles. It is particularly important to an economical thickening action that this tubular formation of solids be discharged from the surface of the filtering element in mass formation and not broken up into small pieces. If the solids are discharged in small pieces, they settle very much less rapidly and are apt to be drawn back against the surfaces of the filter elements when the filtration suction is again applied.

The step-by-step action of the present apparatus which causes an extremely sudden appearance of a liquid film from the source of cleansing pressure upon the exterior surfaces of the filtering elements promptly stretches somewhat the tubes of accumulated solids and promptly starts them skidding or sliding down over this lubricating film. The tubes of solids are not broken up and fall rapidly in the mixture. They fall a considerable distance in from two to three seconds, gaining such a velocity that when filtration suction is again applied the tubes of solids are not redeposited upon the filter elements. In order to be so redeposited, their downward motion must be stopped and the tubes again contracted and moved toward the socks. This action requires fully another second of time. However, in the meantime the tube has fallen such a distance that the suction action is confined to considerably less than the whole area of the tube inasmuch as a considerable portion of the tube has fallen below the bottom end of the filter element. Hence successive tubes of solids are discharged from the filter elements and these fall rapidly to the bottom of the tank 10.

When thickening materials that settle fairly rapidly a 2-second kick-back is usually sufficient to cause the tubes of solids to settle without being redeposited on the filter elements, but when treating materials that do not settle readily, the period of cleansing pressure application is increased say to 3 seconds, or preferably the wall portion 60 is provided on the valve plug and an instantaneous pause of say 1 second is made with both cleansing pressure and filtration suction cut off from the filter elements which are undergoing cleansing. This permits the tube of solids to fall completely clear of the filter element before suction is again applied.

Figure 3:
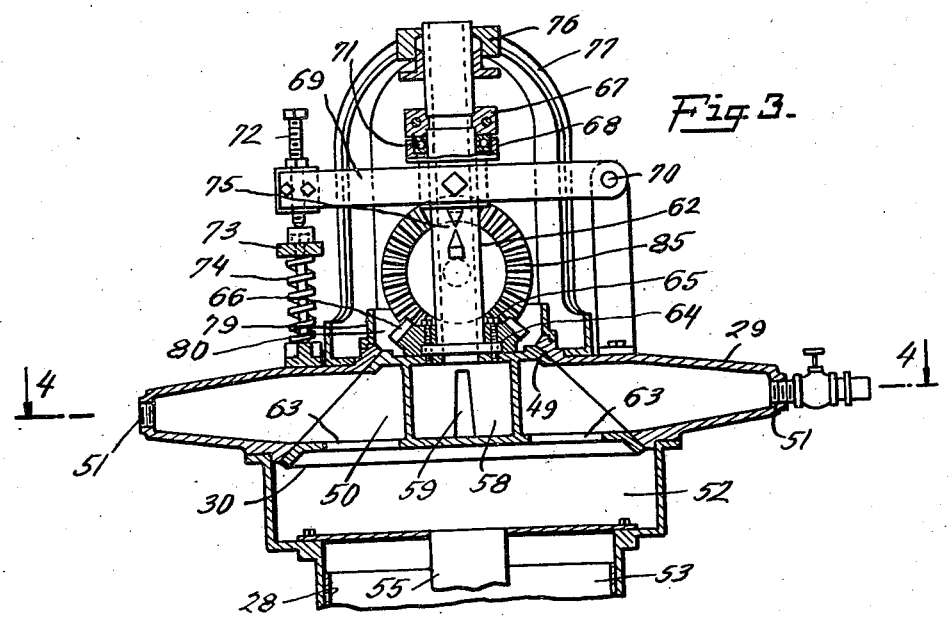
Fig. 3 is a somewhat enlarged transverse section showing in greater detail the timing valve and casing.

Referring now to Figs. 1 and 3 of the accompanying drawings, the rotating plug 30 of the timing valve is held against its conical seat by means of the tubular member 62 which is securely fastened to the top of the valve plug by a flanged portion 64 through which pass bolts 65 that also hold a bevel gear 66 firmly secured to the valve plug. Toward the upper end of tubular member 62 a pair of collars 67 and 68 are provided. Collar 67 rotates with member 62 and collar 68 remains stationary since it is held in position through its association with a pair of vertically movable bars 69 which pass each side of member 62 and which are pivoted at 70 to a stationary part of the valve casing. These parallel bars 69 are provided for the purpose of holding the rotating valve plug 30 against its seat and for the purpose of reducing friction, ball bearings 71 are placed between the coacting collars 67 and 68.

The adjustment and regulation of the pressure of valve plug 30 against its seat is accomplished by means of an adjustable screw 72 at the left hand end of the bars 69 which coacts with a member 73 that bridges a pair of upwardly acting spiral springs 74, only one of which, however, is seen in the drawings. Springs 74 thus urge the free ends of bars 69 upwardly and resiliently hold the valve plug in position. A pair of pointers 75, one of which rotates with member 62 and the other of which is fixed, serves to indicate when port 59 of the rotating plug is directly opposite one of the ports 48.

The upper end of tubular member 62 terminates in a stuffing box 76 carried on a pair of upstanding members 77. By means of this stuffing box a liquid-tight joint is made between the rotating tubular member 62 and a flanged T coupling 78 to which the cleansing pressure pipe 61 is connected. In order to prevent leakage between the upper part of the joint betwen rotating plug 30 and the stationary valve casing 29 a liquid seal is provided. For this purpose an upstanding collar 79 surrounds the upper end of the valve plug and holds a body of oil 80. This oil also serves to lubricate the wearing surfaces of the valve and of the bevel gears.

When liquid is used as a source of cleansing pressure, the sudden arresting of its movement by the closing of the timing valve during the step-by-step action creates an undesirably high pressure and for this reason an air chamber 81 is connected to the T coupling 78 for the purpose of absorbing by the compression of air therein the transient abnormal increase in pressure.

A convenient form of actuating mechanism for imparting the step-by-step movement to the timing valve is illustrated in Figs. 7 and 8. The toothed wheel 82 of this mechanism effects the rotation of valve plug 30 through the instrumentality of shaft 83, shaft 84 and bevel gear 85 which meshes with bevel gear 66. Shaft 83 is mounted on suitable bearings which are carried on an appropriate steel frame-work 86. At the opposite end this frame-work carries an electric motor 87 which drives through appropriate gear reduction a shaft 88 mounted on frame 86 parallel with shaft 83. The gear reduction may be of any suitable form but conveniently comprises a belt or silent chain 89 connecting a pinion on the motor shaft with a gear 90, together with a pinion 91 which is mounted on the same shaft as gear 90 and a gear 92 mounted on shaft 88.

In close proximity to the teeth of wheel 82 there are mounted a pair of sprockets 93 which are carried on stub shafts so as to bring the axis of these sprockets closer to shaft 83 than the radius of wheel 82. A second pair of sprockets 94 are mounted on shaft 88 in alignment with sprockets 93 and over these pairs of aligned sprockets there passes a pair of sprocket chains 95 and 96. Each of these chains 95 and 96, at intervals are provided with links having oppositely disposed projections 97 which by means of apertures therein are adapted to carry pins extending laterally between the two chains for the purpose of engaging the teeth of wheel 82 to actuate the same.

These pins are preferably in the form of friction-reducing rollers and, in Fig. 7 two of the projections 97 are to be seen equipped with such actuating pins or rollers 98 and 99 respectively.

The notches of wheel 82 are relatively deep and the diameter of sprockets 93 is substantially equal to the pitch of the notches, or the distance between adjacent notches. Hence as each of the pins 98 and 99 pass around the circumference of sprockets 93, they move the wheel 82 forward in the direction of the arrow a distance of one notch spacing and, inasmuch as there are twice as many notches in wheel 82 as there are ports 48 in the valve casing 29, it is necessary to advance wheel 82 a distance of 2 notches in order to move port 59 of the valve plug 30 from one port 48 to an adjacent port 48.

The action of pins 98 and 99 in engaging the notches of wheel 82 is similar to that of a Geneva gear inasmuch as each of these pins enters the notches of the wheel radially, and then suddenly changing their direction because of the small diameter of sprockets 93, snaps wheel 82 forward notch by notch. The result is that the valve plug 30 is given a step-by-step movement and the position of the valve from one step to another is changed with extreme suddenness.

If we assume again that port 59 is opposite the top port 48 of Fig. 4, this corresponds to the position which was occupied by wheel 82 before it was engaged by roller 99. Roller 99 having just left one of the notches of wheel 82, it has moved the wheel forward and consequently valve plug 30 to a position where port 59 is opposite the wall section of valve casing 29 between top port 48 and the next adjacent port to the right, wall portion 60 of plug 30 being opposite top port 48. Thus roller 99 serves to move the wheel 82 and valve plug 30 to the pause position where both filtration suction and cleansing current pressure are cut off. Roller 98 which is shown as just entering one of the notches of wheel 82 moves the valve from this pause position to the position where port 59 is opposite the next port 48 and cleansing current is applied to a separate set or group of filtering elements.

The time required by pin 99 to travel the short distance between pins 98 and 99 represents the time during which the valve is held in the pause position, and the time required for pin 98 to travel the long distance between pins 98 and 99 represents the time during which the timing valve remains in the cleansing current application or kick-back position. By placing pins 98 or 99 in other of the projections 97, the length and ratio of these two periods is readily varied. The total time for kick-back and pause may also be varied by varying the speed of the continuously traveling chains 95 and 96 which carry the rollers. This can be readily done through the control of the speed of the driving motor. This variation in the speed of the chain will also vary the time required for a complete revolution of wheel 82 and this determines the lengths of the periods of filtration. The length of the chain may also be increased for greater periods of filtration.

In order to appropriately control the travel of chains 95 and 96, a pair of idler sprockets 100 and 101 is mounted in stationary position below and above the chains in proximity to the sprockets 93. These sprockets cause the chains to hug sprockets 93 both upon their approach thereto and recession therefrom. Also a mechanism for taking up the slack of chains 95 and 96 is provided. This includes a spiral spring 102 which encircles a stationarily mounted rod 103 which can conveniently be fixed to the same support as provided for sprockets 101. The lower end of spring 103 engages the outer ends of a pair of levers 104 through a block 105 that slides upon rod 102. Levers 104 are pivoted on shaft 88 and carry a pair of idler sprockets 106. In order to adjust the pressure exerted by idlers 106 upon the chains, a nut 107 is threaded upon the upper end of rod 103 by which the compression of spring 102 can be adjusted.

Motor 87 is mounted on a pair of suitable ways and its position thereon may be adjusted by means of screw 108 for the purpose of taking up the slack of the belt or chain 89. This chain is provided with a suitable protecting casing 109 and an additional casing 110 surrounds notched wheel 82 and the chain mechanism. A casing 111 covers the gears 91 and 92. These casings are provided for safety and to protect the mechanism from corrosive liquids that are apt to come in contact therewith.

Referring now to Figs. 5 and 6, a modified form of filtering apparatus is here shown which involves the use of a group of containers for the material to be thickened, thereby increasing the flexibility of operation. In this form of apparatus, individual containers or tanks 112 are provided for each bank 31 of filtering elements, the arrangement of the filtering elements in these banks lending itself particularly well to this type of tank construction. Tanks of circular, or of any other convenient shape, may be employed. In these two figures only one bank is shown in position within its individual tank so as to enable the more essential features of this tank construction to be more clearly shown. The details of the timing valve mechanism have also been omitted for the sake of clearness.

Each of these sectional tanks 112 is made just wide enough at their inner ends 113 to conveniently accommodate the rectangularly shaped bank 31 of filtering elements. From this end the sides slope outwardly to a point 114 so as to leave a space at each side of the filter element bank. From this point to the outer end 115 the sides of the tank are parallel. Tank sections of this general shape conveniently nest together around the casing 29 of the common timing valve and around the filtrate receiver 116.

This filtrate receiver is similar to receiver 28 of Fig. 1 but is preferably made to extend to the bottoms of the tanks 112. The sloping sides of tanks 112 are made to extend inwardly from the inner faces 113 as shown at 117 and 118. The extensions 118 of these sides occur on alternate tank sections 112 and are considerably longer than extensions 117 so as to enable these alternate sections to be firmly secured to the receiver 116. For this purpose, suitable fittings 119 are placed upon receiver 116 by which extensions 118 are bolted to the receiver. The shorter extensions 117 of the alternate tank sections are bolted to the longer extensions 118 of the alternate sections as may be seen at 120 in Fig. 6. The tank sections are supported at their outer ends upon a steel frame-work 121 to which the bottoms of the tank sections are bolted through the feet 122.

In order to support the filter element frames within the tank sections 112, steel cross bars 123 extend across between the sloping sides of each of the tanks. Upon these cross bars rest the feet 32 of the filter element frames. The outer ends of the frames are supported in the same manner as shown in Fig. 1 by members 124 which are provided along the upper outer edges of the tank sections. Bolts 125 pass through these members and hold the disconnecting joints between the filter frames and disconnecting valves 27 in fluid-tight relation.

The material to be thickened is fed to the several tank sections through a plurality of conduits 126, one for each pair of tanks. Each of these conduits has two branches 127 and 128 leading through suitable control valves to adjacent tank sections. The overflow from each tank 112 takes place over the upper edge of plates 113 against a deflector 129 which is mounted adjacent the inner wall 113 a short distance below the top of the tank. The overflow lips of the several tanks discharge into vertical channels 130 formed by the extensions 118 between adjacent tanks, and by the surface of receiver 116 and the inner walls 113 of the tanks. These several independent channels discharge at the bottom into an annular trough 131 which is located at the bottom of receiver 116 and preferably secured thereto. In order to prevent the leakage of the overflow, the walls forming channels 130 are made to telescope slightly within the walls of the trough 131. From the overflow trough an outet pipe 132 conducts the overflowing material. The filtrate which collects within receiver 116 is discharged through pipe 133 which is provided with an appropriate pump. The vapor within the receiver is carried away by means of a pipe connected to chamber 54 of the receiver as in the apparatus previously described.

When the thickening apparatus is made in sections it is convenient, instead of using the rake mechanism shown in Fig. 1 for removing the settled solids, to provide each of the individual tanks 112 with sloping or conical bottoms 134 as shown in Fig. 6. The solids accumulate on this sloping bottom and because of the steepness thereof, slide toward the discharge openings at the center which may be controlled by means of valves 135.

The material passing through these valves is discharged into a common collecting vessel 136 which is also provided with a conical bottom and from which the solids for the entire thickening apparatus may be withdrawn through the outlet conduit 137.

Referring now to the apparatus of the present invention as a whole, it may be remembered that by arranging the filter elements in rectangular banks disposed around the central common filtrate receiver and timing valve a considerable conservation of space is secured. It is possible to place a relatively large number of filtering elements within a single tank of a given size or within an apparatus as shown in Figs. 5 and 6 of the same diameter as the single tank. Through the arrangement of the timing valve and filtrate collecting chamber in the same plane with the tops of the filtering element frames and by placing the filtrate receiver immediately below the timing valve, the friction losses in the vacuum lines are materially reduced, and moreover, the filter frames are conveniently connected and removed from the filtering apparatus and the cost of manufacture of these parts is reduced. The surrounding of the filtrate receiver by the filtrate, either as shown in Fig. 1 or Fig. 6, aids materially in preventing the loss of heat in the filtrate through the cooling thereof.

The construction of the apparatus in a plurality of individual tank sections provides for increased flexibility of operation since, when it is desired to thicken material at a rate which is materially less than the capacity of the apparatus as a whole, it is only necessary to cut out the desired number of sectional tanks through the instrumentality of the control valves provided therefor. In this way a smaller amount of material is undergoing treatment at any given time. The material therefore remains in the apparatus for a shorter length of time and the production of certain undesirable chemical reactions when treating certain mixtures is avoided. Furthermore, there is a saving in the cost of installation, particularly in the smaller units. In such units it is convenient to install a full size timing valve which is capable of controlling considerably more tanks than it is desired to employ for the initial installation. For example, one-half of the individual tank sections may be omitted, leaving out alternate tanks, their banks, frames and filtering elements entirely. This provides a half size filtering apparatus which can be made full size by the addition of the omitted tanks whenever an increase in output is required.

Through the operation of the timing valve by step-by-step movement a sudden shifting and pause is provided for which enables the cleansing pressure to compress the vapors within the filtering elements when filtering hot liquid mixtures more effectively, the suddenness with which this vapor formation is checked being an extremely important factor in increasing the filtration rate of hot liquid mixtures. Finally, the actuating mechanism of the invention produces the desired step-by-step movement in a particularly effective manner.

I claim:

1. In an apparatus for filtering and thickening mixtures, a plurality of filter elements submerged in the material to be thickened and disposed in a plurality of banks of parallel rows of elements arranged about a filtrate receiver located centrally thereof, means for applying suction to the receiver to effect filtration, connections between the filter elements and the receiver, means for removing filtrate from the receiver, and means for collecting the thickened material.

2. In an apparatus for filtering and thickening mixtures, a plurality of filter elements submerged in the material to be thickened and disposed in a plurality of banks of parallel rows of elements arranged about a receiver located centrally thereof, means for producing a partial vacuum in the receiver to effect filtration, a source of cleansing pressure for effecting the removal of solids accumulating on the filter elements, a timing valve for connecting the filter elements alternately to the filtrate receiver and said pressure source, means for removing the filtrate from the receiver, and means for collecting the thickened material.

3. In an apparatus for filtering and thickening mixtures, a plurality of filter elements submerged in the material to be thickened and arranged in a plurality of circularly disposed banks, each bank comprising a plurality of parallel rows of elements, a filtrate receiver located centrally of said circularly disposed banks, a source of pressure for cleansing said filter elements, a timing valve also located centrally of said circularly disposed banks for connecting the filter elements alternately to the filtrate receiver and to said pressure source, means for applying suction to the filtrate receiver to effect filtration, means for removing filtrate therefrom, and means for collecting the thickened material.

4. In an apparatus for filtering and thickening mixtures, a filtrate receiver having a timing valve associated therewith, said valve being in communication with the receiver and with a source of cleansing pressure, a plurality of filtering elements submerged in the material to be thickened and arranged in a plurality of banks of parallel rows, said banks being radially placed about the receiver and timing valve, means for applying suction to the receiver to produce filtration, means for removing filtrate from the receiver, and means for collecting the thickened material.

5. In an apparatus for filtering and thickening mixtures, a group of containers for the material to be thickened, a plurality of filtering elements supported in each of the containers, a common timing valve for the several filtering elements located centrally of the group of containers, means for cutting off the feed of the material to be thickened from certain of said containers, and means for cutting off the filtering elements in these containers from the timing valve.

6. In an apparatus for filtering and thickening mixtures, a filtrate receiver, a timing valve in communication therewith and with a source of cleansing pressure, a plurality of filtering elements arranged in a plurality of banks of parallel rows, said banks being radially placed about the receiver and timing valve, a container for the material to be thickened surrounding each of said banks, means for feeding the material to said containers, means for applying suction to the filtrate receiver to produce filtration, means for removing the filtrate from the receiver, and means for removing the thickened material from the containers.

7. In an apparatus for filtering and thickening mixtures, a filtrate receiver, a plurality of containers for the material to be thickened surrounding the receiver, means for feeding said material to the containers, a plurality of filtering elements in each container, a common timing valve for said elements, said valve being in communication with the receiver and with a source of cleansing pressure, means for applying suction to the receiver to produce filtration, means for removing filtrate from the receiver, and means for removing the thickened material from the several containers.

8. In an apparatus for filtering and thickening mixtures, a central filtrate receiver, a plurality of containers for the material to be thickened surrounding said receiver, alternate containers being secured to said receiver, and the intermediate containers being secured to said alternate containers, a plurality of filtering elements disposed in each container, a common timing valve for said filtering elements, means for applying suction to the filtrate receiver to produce filtration, means for removing filtrate from the receiver, and means for removing the thickened material from said containers.

9. In an apparatus for filtering and thickening mixtures, a central filtrate receiver, a plurality of containers for the material to be thickened surrounding said receiver, means for feeding material to be thickened to the containers, a plurality of filter elements in each container, a common timing valve for said filtering elements, means for applying suction to the receiver to produce filtration, means for removing filtrate from the receiver, means for removing the thickened material from the containers, an annular trough secured to the exterior of the filtrate receiver, and means on the containers for conveying the overflow therefrom into said trough.

10. In an apparatus for filtering and thickening mixtures, a plurality of filtering elements submerged in the mixture, a timing valve for connecting the filtering elements periodically with a source of cleansing liquid under pressure, said valve during its operation acting to arrest the flow of said liquid, and a chamber connected to said valve having a body of air therein which is compressed by the momentum of said liquid when its flow is arrested.

11. In an apparatus for filtering and thickening mixtures, a plurality of filtering elements submerged in the mixture and divided into a plurality of groups of one or more elements, a source of suction for producing filtration during which solids accumulate on the surface of the elements, a source of cleansing pressure for effecting the removal of said accumulated solids, a common timing valve for the filtering elements having three positions with respect to each of said groups of filtering elements, the first position connecting a group to the source of suction, the second position to the source of cleansing pressure, and the third position cutting off the group from both suction and cleansing pressure, and means for actuating said valve in a step-by-step movement successively and repeatedly throughout said three positions with respect to the several groups of filtering elements.

12. In an apparatus for filtering and thickening mixtures, a plurality of filtering elements submerged in the mixture, a source of suction for producing filtration during which solids accumulate on the surface of the elements, a source of cleansing pressure for flooding off these accumulated solids, and a timing valve provided with stationary and movable members, the stationary member having a plurality of ports radiating from a common chamber each port connecting with one or more of the filtering elements, and said common chamber being in communication with the source of suction, and the movable member being connected to the source of cleansing pressure and coacting with the ports of the stationary member to repeatedly replace the filtering suction by cleansing pressure and to cut off both pressures, thus allowing the accumulated solids to move downwardly over the surface of the filtering elements free of the influence of either suction or removal pressure.

13. In an apparatus for filtering and thickening mixtures, a timing valve having stationary and movable members, the stationary member being provided with a central chamber having a tapering bore and with a plurality of ports opening into passage-ways radiating therefrom, and one or more filtering elements submerged in the mixture to be thickened and connected to each of said passage-ways, and the movable member having a tapering surface rotating in contact with said bore and being provided with a channel for connecting the cleansing pressure to each of said ports successively.

14. In an apparatus for filtering and thickening mixtures, a plurality of filtering elements submerged in the mixture, a common timing valve for connecting said elements to filtration suction and cleansing pressure, and means for actuating said valve including a notched wheel and a continuous band passing over a sprocket mounted adjacent the periphery of said wheel, said band carrying one or more projections for engaging said notches, the diameter of said sprocket being substantially equal to the pitch of the notches whereby each projection advances the wheel a distance of one notch in a step-by-step movement.

15. In an apparatus for filtering and thickening mixtures, a plurality of filter elements submerged in the material to be thickened and arranged about a filtrate receiver located substantially centrally thereof, means for applying suction to the receiver to effect filtration, connections between the filter elements and the receiver, means for removing filtrate from the receiver, and means for collecting the thickened material.

In testimony whereof I affix my signature.

ALBERT LEGRAND GENTER.